United States Patent [19]

Sederquist

[11] 4,203,950

[45] May 20, 1980

[54] STEAM REFORMING REACTOR DESIGNED TO REDUCE CATALYST CRUSHING

[75] Inventor: Richard A. Sederquist, Newington, Conn.

[73] Assignee: United Technologies Corporation, Hartford, Conn.

[21] Appl. No.: 864,511

[22] Filed: Dec. 27, 1977

[51] Int. Cl.² ............................. B01J 7/00; B01J 8/06
[52] U.S. Cl. ...................................... 422/197; 48/94; 422/203; 422/211
[58] Field of Search ............. 23/288 R, 288 F, 288 K, 23/288 M; 422/197, 203, 198, 211; 48/94

[56] References Cited

U.S. PATENT DOCUMENTS

| | | | |
|---|---|---|---|
| 2,579,843 | 12/1951 | Mader | 422/197 |
| 3,041,149 | 6/1962 | Houdry | 23/288 F |
| 3,127,247 | 3/1964 | Davis, Jr. | 23/288 R |
| 3,154,388 | 10/1964 | Purse | 23/288 F |
| 3,166,382 | 1/1965 | Purse et al. | 23/288 F |
| 3,685,972 | 8/1972 | DePalma et al. | 23/288 F |
| 3,824,790 | 7/1974 | Thomaides | 23/288 F |
| 4,098,587 | 7/1978 | Krar | 48/94 |
| 4,098,588 | 7/1978 | Buswell et al. | 48/94 |
| 4,098,589 | 7/1978 | Buswell et al. | 48/94 |

*Primary Examiner*—Michael S. Marcus

[57] ABSTRACT

A reactor for steam reforming of hydrocarbon fuel to produce hydrogen having an inner cylindrical wall and outer cylindrical wall which provide an annular reaction chamber within which solid particles such as catalysts are disposed. During operation of the reactor, the reactor goes through temperature cycles in which the temperature of the reactor is increased and decreased, such as, during start up and shut down and the volume within the annular reaction chamber increases during heating a greater amount than the volume of the solid particles due to different coefficients of expansion of the inner and outer walls and of the solid particles. This differential expansion allows the solid particles to slump when the temperature of the reactor is elevated and results in pressure being exerted by the walls of the reactor against the solid particles when the temperature of the reactor is reduced. This pressure may result in crushing of the solid particles. The reactor incorporates a design which eliminates or reduces crushing of the solid particles.

1 Claim, 2 Drawing Figures

STEAM REFORMING REACTOR DESIGNED TO REDUCE CATALYST CRUSHING

BACKGROUND OF THE INVENTION (1) Field of the Invention

The invention relates to annular reactors such as those used in steam reforming for producing hydrogen from a hydrocarbon fuel.

(2) Description of the Prior Art

Catalytic reactors for converting hydrocarbon fuel to hydrogen are well known in the art. The reactors are of tubular design and may have an inner cylindrical wall with catalyst interposed between the walls. Vaporized hydrocarbon fuel mixed with steam is circulated through the catalyst to produce hydrogen. Typically, the reactors are about 2 to about 40 feet long and have diameters less than about one foot. The outer wall of the reactor is heated to provide energy for the endothermic conversion of hydrocarbon fuel to hydrogen. During the operation of such reactors, the reactors undergo temperature cycling during heat up to operating temperature and cool down when the reactor is not in service. The reactor walls and catalysts disposed within the reactor may be cycled through a temperature of as much as 2000° F.

During thermal cycling, the catalyst tends to be crushed. During the part of the thermal cycle when the temperature of the reactor is being elevated, the walls of the reactor expand creating a positive change in the internal volume of the reactor. During the time that the reactor's temperature is being elevated, the catalyst disposed within the reactor also expands. However, since the coefficient of expansion of the walls of the reactor exceeds the coefficient of expansion of the catalyst, the internal volume of the reactor expands more than the volume of the catalyst creating voids within the catalyst. The voids are filled by catalyst which tends to slump downwardly into the voids.

Upon cool down, the walls of the reactor contract and there is a decrease in internal volume of the reactor. However, since catalyst has been redistributed downwardly within the reactor, due to slumping, cooling of the reactor results in compaction of the catalyst by mechanical pressure exerted by reactor walls against the catalyst. A portion of the pressure is absorbed by the partially elastic walls, and a portion is absorbed by the partially elastic catalyst material. However, it has been found that at excessive pressures, the catalyst is crushed and if the catalyst is particularly strong the outer walls of the reactor may deform beyond their elastic limit. As the reactor is cycled through many thermal cycles, the catalyst crushing problem becomes more severe after each thermal cycle. If enough catalyst is crushed, voids in the catalyst bed are reduced, increasing process pressure drop. The reactor may become clogged to a point where it is necessary to remove the crushed catalyst and insert new catalyst.

It is an object of the present invention to provide a reactor which reduces crushing of solid particles disposed within the walls of the reactor.

It is a further object of the present invention to reduce or eliminate reactor deformation and failure during repeated thermal cycling of the reactor.

It is another object of the present invention to extend the number of cycles a bed of catalyst can be used.

SUMMARY OF THE INVENTION

The present invention provides an annular reactor which reduces the mechanical pressure of the walls of the reactor upon the solid particles such as catalysts or heat transfer packing material disposed within the walls of the reactor, thus reducing solid particle crushing after repeated thermal cycling. In an annular shaped reactor the mechanical pressure of the walls against the solid particles is a function of the thermal expansion coefficients of the inner and outer walls, the thermal expansion coefficient of the solid particles, the wall diameter of the inner and outer walls at the wall/solid particle interface, the thermal cycle (the temperature change through which the reactor goes through in any one cycle), the number of cycles through which the reactor has gone, the modulus of elasticity of the walls and the bulk modulus of elasticity of the solid particles.

It has been found that solid particle crushing is reduced if an annular reactor having an inner and outer wall with solid particles disposed therebetween is designed to meet the following constraint equation:

$$P_s = \frac{\alpha \left[ \dfrac{D_o^2 \Delta T_o - D_i^2 \Delta T_i}{D_o^2 - D_i^2} \right] - \alpha_s \Delta T_s}{\dfrac{1}{2E} \left[ \dfrac{\dfrac{D_o^3}{t_o} + \dfrac{D_i^3}{t_i}}{D_o^2 - D_i^2} \right] + 6.67 \times 10^{-7} \text{psi}^{-1}}$$

Where:
- $\alpha$ = the thermal expansion coefficient of the walls (°F.$^{-1}$)
- $\alpha_s$ = the thermal expansion coefficient of the solid particles (°F.$^{-1}$)
- D = the wall diameter at the wall/solid particle interface (in.)
- t = wall thickness (in.)
- o = outside wall
- i = inside wall
- s = solid particles
- $\Delta T$ = the thermal cycle (°F.)
- E = the modulus of elasticity of the walls (psi)

Where the calculated value $P_s$ is preferably less than about 7500 psi, most preferably less than about 2000 psi, $\alpha$ is greater than $\alpha_s$ and $D_o$ is greater than $D_i$. Preferred ranges of each of the above parameters in the constraint equation will be set forth in the detailed description of the invention.

DETAILED DESCRIPTION OF THE INVENTION

Figure 1:
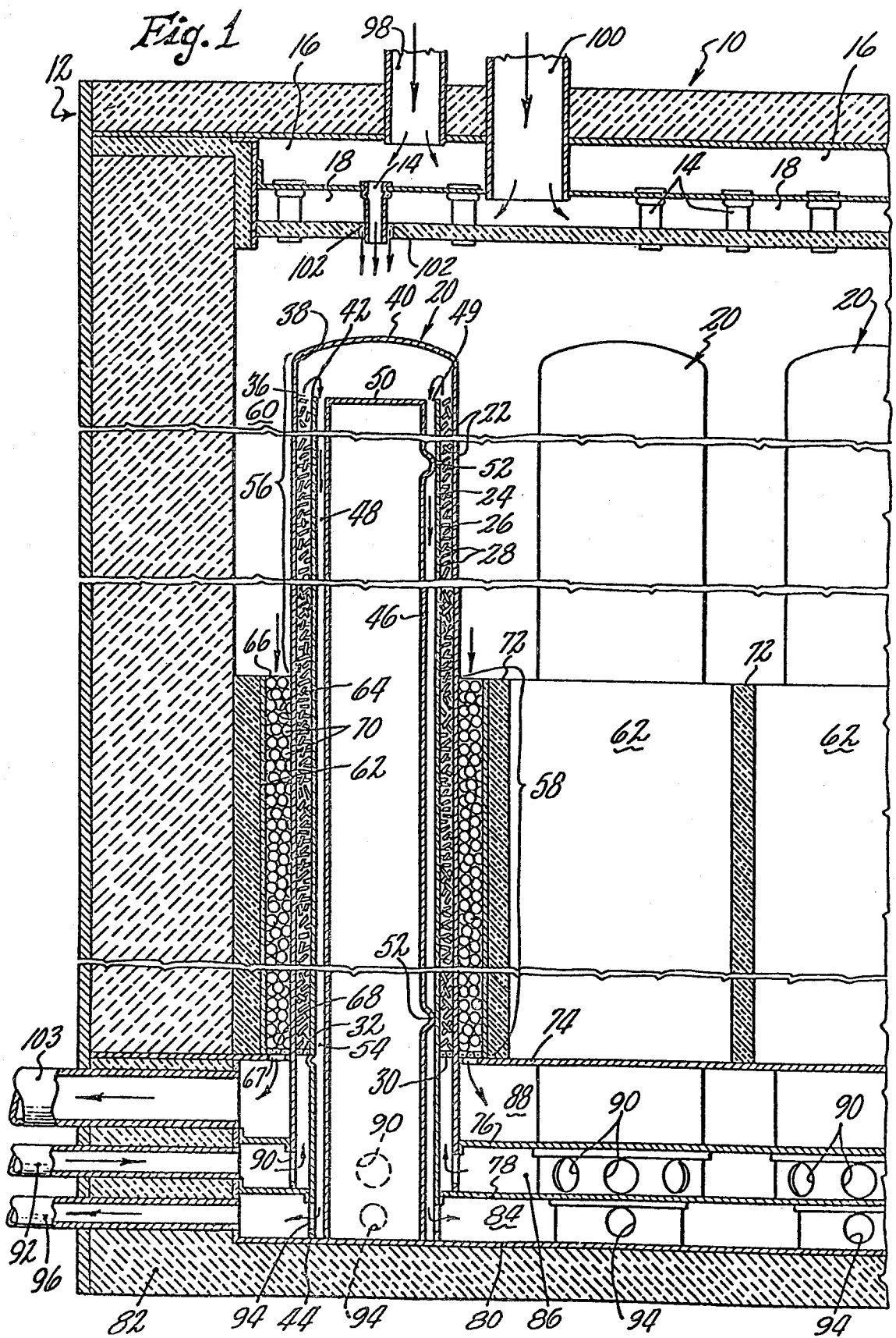
FIG. 1 is a vertical, cross-sectional view of a reaction apparatus including the reactor of the present invention.

Reaction apparatus 10 is for the purpose of steam reforming hydrocarbon fuel in the presence of a suitable catalyst to produce hydrogen. Reactor apparatus 10 comprises furnace 12 including burner nozzles 14, burner fuel manifold 16, and air manifold 18. Disposed within furnace 12 is a plurality of tubular reactors 20.

Each reactor 20 comprises outer cylindrical wall 22 and inner cylindrical wall 24 defining annular reaction chamber 26. Reaction chamber 26 is filled with steam reforming catalyst pellets 28 which are supported on screen 30 disposed at inlet 32 of the reaction chamber 26. Any suitable steam reforming catalyst, such as nickel on alumina may be used to fill reaction chamber 26 from inlet 32 to outlet 36. The cylinder which is defined by outer wall 22 is closed at its upper end 38 by end cap 40. Inner wall 24 has lower outlet end 44 and upper inlet end 42 which terminates below end cap 40.

Disposed within inner wall 24 is cylindrical plug 46 which has an outer diameter somewhat smaller than the inner diameter of inner wall 24 to define annular regeneration chamber 48 having an inlet 49. Although plug 46 may be a solid rod, it is preferred that plug 46 be a tube blocked by end cap 50 so that reaction products exiting the reaction chamber 26 must flow around plug 46 through regeneration chamber 48. Spacing between plug 46 and center tube 24 is maintained by dimples 52 in the plug 46.

The function of regeneration chamber 48 is to return heat from the reaction products leaving outlet 36 back into the catalyst bed of reaction chamber 26. Outlet 54 of regeneration chamber 48 is located adjacent inlet 32 of the catalyst bed rather than at lower outlet end 44 of inner wall 24 even though the annulus defined between plug 46 and where wall 24 extends to outlet end 44 to provide for preheating of the process fuel before it enters the catalyst bed. Also, plug 46 extends the entire length of reaction chamber 26 so that inlet 49 of regeneration chamber 48 is adjacent outlet 36.

Each reactor 20 may be considered to comprise upper portion 56 and lower portion 58. Upper portion 56 is disposed within burner cavity 60. Cavity 60 is that volume of furnace 12 within which actual combustion of the fuel and air fed into furnace 12 takes place. This volume is characterized by very high temperatures, considerable radiant and convective heating of reactors 20.

Lower portion 58 of reactor 20 is surrounded by clindrical wall 62 spaced outwardly from wall 22 defining annular burner gas passageway 64 having inlet 66 and outlet 67. Outlet 67 is adjacent inlet 32 of reaction chamber 26. Passageway 64 is filled with heat transfer packing material 70 such as spheres of alumina. Material 70 is supported on screen 68. Space 72 between adjacent conduits 62 is filled with insulating material such as ceramic fiber insulation which is supported on plate 74 extending across furnace 12 and which has holes through which reactors 20 pass. Plate 74 and the material within space 72 prevents the furnace gases from flowing around the outside of conduits 62.

In addition to plate 74, plates 76, 78, and 80 also extend across furnace 12 and define manifolds therebetween. Plate 80 rests on bottom wall 82 of furnace 12. Plates 78 and 80 define reaction products manifold 84. Plates 76 and 78 define process fuel inlet manifold 86 and, plates 74 and 76 define furnace gas outlet manifold 88. Plugs 46 and inner wall 24 abut bottom plate 80. Outer walls 22 of reactors 20 abut plate 78, and, walls 62 abut plate 74.

In operation, a mixture of steam and vaporized hydrocarbon fuel from manifold 86 fed by conduit 92 enters inlet 32 of reaction chamber 26 by way of holes 90 in wall 22. The mixture is heated by the furnace gases flowing countercurrent to the flow of the mixture through passageway 64 and begins to react in the presence of catalyst particles 28. As the fuel, steam, and reaction products travel upwardly within reaction chamber 26, they react and absorb energy. At outlet 36 the temperature of the reaction products reaches a maximum. The hot reaction products enter inlet 49 of regeneration chamber 48. As the reaction products traverse the length of the annular regeneration chamber, energy is transferred into reaction chamber 26. Reaction products enter reaction products manifold 84 through holes 94 in center tube 24, and are transported via conduit 96 to further processing, storage or consumption.

Fuel for furnace 12 enters manifold 16 via conduit 98 and passes into burner cavity 60 by way of nozzles 14. Air enters manifold 18 via conduit 100 and enters burner cavity 60 via annular passageways 102 surrounding each nozzle 14. The hot gases travel through passageways 64 into manifold 88 are exhausted via conduit 103. Within the burner cavity temperatures are sufficiently high to provide high heat transfer rates over upper portions 56 of reactors 20 despite the relatively low heat transfer coefficient of the gases. As the furnace gases drop in temperature while moving further away from burner nozzles 14, the heating rate would normally become unacceptably low. However, this drop in temperature is reduced by the use of annular burner gas passageways 64 having heat transfer material 70 disposed therein. Passageways 64 increase the local heat transfer. This results in high heat transfer rates over both upper and lower portions 56 and 58 despite the lower temperatures of the furnace gases over lower portions 58.

During operation of reaction apparatus 10, reactors 20 go through thermal cycles wherein the temperature of outer wall 22 and inner wall 24 and catalyst 28 disposed therein undergo temperature cycles, $\Delta T$, which may range from about 400° to about 2000° F. As the temperature of walls 22 and 24 increases, the volume of annular reaction chamber 26 increases thus creating voids which are filled by catalyst pellets 28 which tend to slump down into annular reaction chamber 26 when its temperature is elevated. Although catalyst 28 expands when heated, its expansion is less than the expansion of the volume of annular reaction chamber 26.

Upon cooling of reactor 20, walls 22 and 24 contract and exert pressure on catalyst pellets 28 within annular reaction chamber 26. At sufficiently high cold reactor pressures, catalyst pellets 28 will be crushed.

During heating, cylindrical wall 62 which is spaced outwardly from wall 22 expands. As the temperature rises, the volume of annular gas burner passageway 64 expands more than the volume of heat transfer packing material 70, and material 70 slumps in passageway 64. Upon cooling, pressure will build up between walls 62 and wall 22. Material 70, disposed within annular burner gas passageway 64 may be crushed.

Generally speaking, high mechanical pressure can be exerted on solid particles, such as, catalyst beds or packings, which are heated in an annular container and then cooled. Due to higher coefficients of thermal expansion of the container walls than the solid particles, the solid particles slump into voids formed during heating of the container. On cool down the container shrinks around the solid particles causing high mechanical pressure and crushing of the solid particles. Tension is placed on the outer walls of the container. Inner walls are subjected to compressive forces. Equating the final displacement of the container walls and solid particles following a thermal cycle, the following equation expressing the mechanicl pressure on the solid particles is found:

Equation (1)

$$P = \frac{\alpha\left[\dfrac{D_o^2 \Delta T_o - D_i^2 \Delta T_i}{D_o^2 - D_i^2}\right] - \alpha_s \Delta T_s}{\dfrac{1}{2E}\left[\dfrac{\dfrac{D_o^3}{t_o} + \dfrac{D_i^3}{t_i}}{D_o^2 - D_i^2}\right] + \dfrac{2}{3B}}$$

Where:
P = mechanical pressure on the solid particle bed after cooling of the annular container (psi)
$\alpha$ = thermal expansion coefficient of the walls (°F.$^{-1}$)
$\alpha_s$ = thermal expansion coefficient of the solid particles (°F.$^{-1}$)
D = wall diameter at wall/solid particle interface (in.)
t = wall thickness (in.)
s = solid particles
o = outer wall
i = inner wall
$\Delta T$ = thermal cycle (°F.)
E = wall elastic modulus (psi)
B = solid particle bulk modulus (psi)

Equation (1) expresses the mechanical pressure exerted on the solid particles after thermal cycling. For simplicity, equation (1) assumes that both the inner and outer walls are made of the same or similar materials having similar thermal expansion and elastic properties. Outer and inner walls can be made of different materials without departing from the scope of the invention. From the numerator it is clear that mechanical pressure can be minimized by minimizing the magnitude of the overall thermal cycle and by minimizing the difference in values of the thermal cycle between the outer and inner container walls and solid particle bed. Practical necessities of a process set operating temperatures which limit the effectiveness of this techique. To a small extent, solid particle crushing can be reduced by heating and cooling the container slowly to minimize the amount of slumping caused by hot outside walls and cold solid particles and the contraction of cold walls around still hot solid particles.

It has been found that with solid particles beds subjected to repeated thermal cycling, that is, repeated heat ups and cool downs, that compaction and a certain amount of crushing is likely to occur. However, crushing can be minimized by designing reactors which can tolerate repeated thermal cycling. It has been found through experimental testing that if the annular reactor is designed to keep the calculated value of P in equation (1) preferably less than about 7500 psi, most preferably less than about 2000 psi, for solid particles which have been compacted due to repeated thermal cycling, then very little solid particle crushing is experienced.

The bulk modulus of elasticity of a bed of solid particles can be determined experimentally. The modulus is the ratio of stress to strain during confined compression of the solid particles. The modulus can be obtained by plotting the change in bed height divided by the bed height versus the pressure on the bed. The modulus is the slope of the curve obtained in the plot. The value of the modulus will depend on factors, such as, the size of the particles, the shape of the particles (whether spherical, cylindrical or having sharp corners), and the composition of the particles.

Solid particles, such as catalysts and packing materials, have an initial value of the bulk modulus in the range from about $10^3$ to about $10^6$ psi. During repeated thermal cycling, that is, about 3 to about 15 cycles and upwards, the bulk modulus of the solid particles tends to increase after each thermal cycle. It has been found experimentally that if the bulk modulus, B, in equation (1) is assumed to be $10^6$ psi, an annular reactor may be designed to reduce solid particle crushing by following constraint equation (2):

Equation (2)

$$P_s = \frac{\alpha\left[\dfrac{D_o^2 \Delta T_o - D_i^2 \Delta T_i}{D_o^2 - D_i^2}\right] - \alpha_s \Delta T_s}{\dfrac{1}{2E}\left[\dfrac{\dfrac{D_o^3}{t_o} + \dfrac{D_i^3}{t_i}}{D_o^2 - D_i^2}\right] + 6.67 \times 10^{-7} \text{psi}^{-1}}$$

Where the calculated value of $P_s$ is preferably less than about 7500 psi, most preferably less than about 2000 psi.

Another benefit of this design criteria for minimizing catalyst crushing is the protection of the outer containing walls from damage due to yielding caused by high mechanical forces on the outer wall on cool down. The use of a thin inner cylinder of the largest diameter possible while still achieving the desired bed size and heat transfer performance can reduce the voids formed on heating and significantly reduce pressure in the reactor on cool down. The inner, non critical cylinder can yield slightly if necessary to relieve mechanical pressure in the reactor, thus protecting the outer containing wall.

Figure 2:
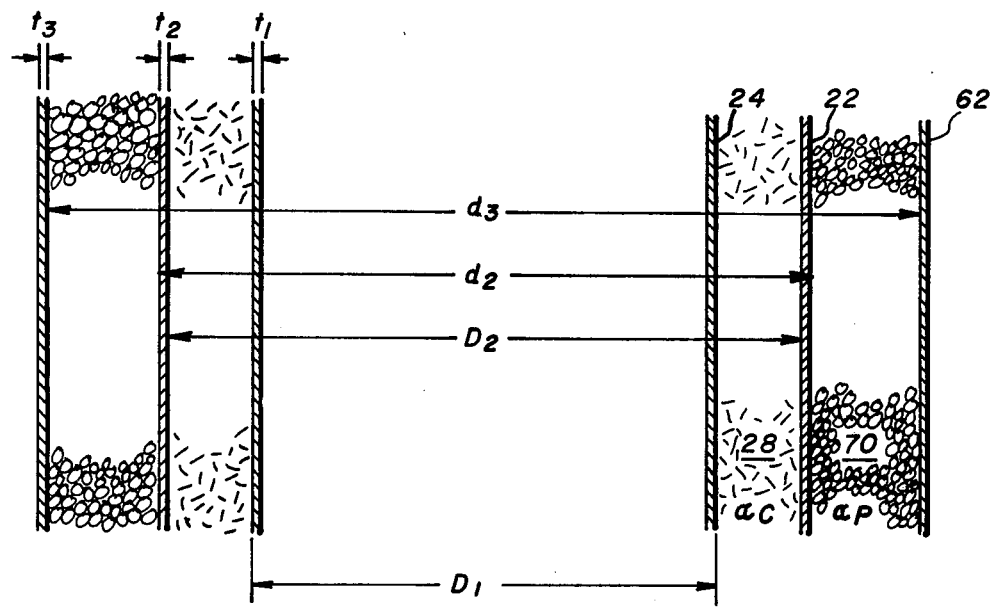
FIG. 2 is a simplified cross section of the lower portion of the catalytic reactor shown in FIG. 2.

Referring to FIGS. 1 and 2, reactor walls 22 and 24 and wall 62 are designed in conjunction with the type of catalyst 28 and the type of heat transfer material 70 so as to reduce the crushing of catalyst 28 and heat transfer packing material 70. Referring to FIG. 2, which is a simplified cross section of lower portion 58 of reactor 20 and wall 62 with packing material 70 between walls 62 and 22, the parameters shown in FIG. 2 are as follows:

1 = inside wall 24
2 = outside wall 22
3 = wall 62
c = catalyst 28
p = packing material 70
$\alpha c$ = thermal expansion coefficient of the catalyst (°F.$^{-1}$)
$\alpha p$ = thermal expansion coefficient of the packing material (°F.$^{-1}$)
$\alpha$ = thermal expansion coefficient of the walls (°F.$^{-1}$)
D = wall diameter at the wall/catalyst interface (in.)
d = wall diameter at the wall/packing material interface (in.)
$\Delta T$ = thermal cycle (°F.)
E = modulus of elasticity of the walls (psi)
t = wall thickness (in.)

It has been determined that catalyst crushing is reduced if the reactor is designed to meet the following constraint equation:

Equation (3)

$$P_c = \frac{\alpha\left[\dfrac{D_2^2 \Delta T_2 - D_1^2 \Delta T_1}{D_2^2 - D_1^2}\right] - \alpha_c \Delta T_c}{\dfrac{1}{2E}\left[\dfrac{\dfrac{D_2^3}{t_2} + \dfrac{D_1^3}{t_1}}{D_2^2 - D_1^2}\right] + 6.67 \times 10^{-7} \text{psi}^{-1}}$$

With respect to catalyst crushing, the calculated value of $P_c$ should be kept below about 7500 psi, preferably about 2000 psi. At $P_c$ values above these, the catalyst may be crushed and, the reactor walls may deform past the elastic limit.

It is preferred that outer wall 22 should be made of a material having a modulus of elasticity, E, of between about $27 \times 10^6$ psi and about $32 \times 10^6$ psi, and preferably should have a thickness, $t_2$ of between 0.1 and about 1 inches.

Inner wall 24 of reactor 20 can be made of a material that is relatively thin compared to outer wall 22. Inner wall 24 should preferably have a modulus of elasticity, E, of between about $27 \times 10^6$ psi and about $32 \times 10^6$ psi and should preferably have a thickness between about 0.02 and about 0.25 inches.

The diameters of inner wall 24 and outer wall 22 at the catalyst/wall interface should be such that a sufficiently large bed of catalyst is provided. It is preferred that outer wall 22 have a diameter between about 2 inches and about 1 foot and that inner wall 24 have a diameter of about 1 inch and about 11 inches.

It is desirable to minimize the difference between the coefficient of expansion of the walls, $\alpha$, and the coefficient of expansion of the catalyst, $\alpha_c$. Preferably, the coefficient of expansion of the walls is between about $5 \times 10^{-6}$ and about $12 \times 10^{-6}°\text{F}^{-1}$, and the coefficient of expansion of the catalyst, $\alpha_c$, is between about $3 \times 10^{-6}$ and about $8 \times 10^{-6}°\text{F}^{-1}$, $\alpha$ being reater than $\alpha_c$.

As mentioned earlier, differenct portions of the reactor, go through different magnitudes of thermal cycling. In general, the minimum temperature that a reactor will incur will be about room temperature and the maximum temperature will be about 200° F. The thermal cycle, $\Delta T$, for the walls and the catalyst will be between about 400° F. and about 2000° F.

It has been determined that packing material crushing is reduced if the reactor is designed to meet the following constraint equation:

Equation (4)

$$P_p = \frac{\alpha\left[\dfrac{d_3^2 \Delta T_3 - d_2^2 \Delta T_2}{d_3^2 - d_2^2}\right] - \alpha_p \Delta T_p}{\dfrac{1}{2E}\left[\dfrac{\dfrac{d_3^3}{t_3} + \dfrac{d_2^3}{t_2}}{d_3^2 - d_2^2}\right] + 6.67 \times 10^{-7} \text{psi}^{-1}}$$

With respect to the problem of packing material 70 being crushed, the calculated value of $P_p$ should be kept below about 7500 psi, preferably below about 2000 psi. At $P_p$ values above these, the packing material may be crushed, and the walls may deform past the elastic limit.

Temperatures in the packing material bed and walls 22 and 62 can range anywhere from room temperature to about 2000° F. The thermal cycle, $\Delta T$, for the walls and the packing material will be between about 400° F. and about 2000° F.

Since wall 62, is not subjected to large pressures, it is preferable that wall 62 have a relatively thin thickness, that is, about 0.02 inches to about 0.25 inches. It is preferable that wall 62 have a diameter, $d_3$, between about 4 inches and about 16 inches. It is preferable that the thermal expansion coefficient, $\alpha_p$, be between about $3 \times 10^{-6}$ and about $8 \times 10^{-6}°\text{F}^{-1}$.

Although the present invention has been described with respect to an endothermic reaction, it should be noted that the present invention is also applicable in reactors used in exothermic processes.

Although the present invention has been described with respect to catalyst crushing and packing material crushing, it should be understood that the present invention is applicable in any chemical reactor having an inner and outer wall and an annular reaction chamber having disposed therein a bed of solid particles.

The walls 22, 24 and 62 should be made of a material that is capable of withstanding the temperatures previously discussed. It is preferable that walls 22 and 24 have a high heat transfer coefficient so as to allow for adequate heating or cooling in the reactor 20. Materials such as steel and stainless steel may be used.

The solid particles disposed in the annular chamber may have any shape, such as spherical, cylindrical, or jagged and irregular. The solid particles can be of various compositions such as ceramics or metals. The solid particles should have a coefficient or expansion less than or equal to the coefficient of expansion of the surrounding walls.

A reactor design of the present invention may be utilized with any height reactor. It is generally used in reactors having heights between about 2 and about 40 feet.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. An annular reactor for steam reforming hydrocarbon fuel comprising:
  a generally cylindrical inner wall, said inner wall having a thickness $t_1$ in the range of 0.02 to 0.25 inches, said inner wall being capable of a limited degree of yielding in the radial inward direction in response to applied forces, said inner wall having an outer diameter $D_1$ in the range of 1 to 11 inches and a coefficient of thermal expansion $\alpha$ in the range of $5 \times 10^{-6}$ to $12 \times 10^{-6}°\text{F}^{-1}$, said inner wall having a modulus of elasticity E in the range of $27 \times 10^{-6}$ to $32 \times 10^{-6}$ psi;
  an intermediate wall, said intermediate wall being coextensive in length with said inner wall and being coaxial therewith to define a first annular chamber, said intermediate wall having a thickness $t_2$ in the range of 0.1 to 1.0 inches and an inner diameter $D_2$ in the range of 2 to 12 inches, the coefficient of thermal expansion and modulus of elasticity of said intermediate wall being chosen to be the same as those of said inner wall, said intermediate wall always being thicker than said inner wall;

catalyst particles disposed in said first annular chamber between said inner and intermediate walls, said catalyst particles having a coefficient of thermal expansion $\alpha_c$ in the range of $3 \times 10^{-6}$ to $8 \times 10^{-6} °F.^{-1}$;

a generally cylindrical outer wall, said outer wall being coaxial with said inner and intermediate walls to define a second annular chamber between a portion of said intermediate and outer walls, said outer wall having a thickness $t_3$ in the range of 0.02 to 0.25 inches, the thickness of the outer wall always being less than the thickness of the intermediate wall, said outer wall having an inner diameter $D_3$ in the range of 4 to 16 inches, said outer wall being chosen to have a coefficient of thermal expansion and a modulus of elasticity commensurate with those of the inner and intermediate walls;

a particulate heat exchange material disposed in said second annular chamber between said outer and intermediate walls, said heat transfer material being pervious to fluid flow and having a coefficient of thermal expansion $\alpha_p$ in the range of $3 \times 10^{-6}$ to $8 \times 10^{-6} °F.^{-1}$, said inner wall, intermediate wall, catalyst particles, outer wall and heat transfer material respectively being subjected to thermal cycles $\Delta T_2$, $\Delta T_1$, $\Delta T_c$, $\Delta T_3$ and $\Delta T_p$, said thermal cycles being between about 400° F. and about 2000° F., said reactor meeting the following constraint equations:

$$P_c \alpha = \frac{\left[\dfrac{D_2^2 \Delta T_2 - D_1^2 \Delta T_1}{D_2^2 - D_1^2}\right] - \alpha_c \Delta T_c}{\dfrac{1}{2E}\left[\dfrac{\dfrac{D_2^3}{t_2} + \dfrac{D_1^3}{t_1}}{D_2^2 - D_1^2}\right] + \dfrac{2}{3B}}$$

and $$P_p \alpha = \frac{\left[\dfrac{D_3^2 \Delta T_3 - D_2^2 \Delta T_2}{D_3^2 - D_2^2}\right] - \alpha_p \Delta T_p}{\dfrac{1}{2E}\left[\dfrac{\dfrac{D_3^3}{t_3} + \dfrac{D_2^3}{t_2}}{D_3^2 - D_2^2}\right] + \dfrac{2}{3B'}}$$

where the mechanical pressure $P_c$ on the solid particle bed after cooling of the walls defining the first annular chamber and the mechanical pressure $P_p$ on the heat transfer material after cooling of the walls defining the second annular chamber do not exceed 7500 psi and wherein B is the bulk modulus of the catalyst particles and B' is the bulk modulus of the heat transfer material; and means delivering a gaseous fuel to the base of said first annular chamber for flow upwardly through said catalyst particles.

* * * * *

UNITED STATES PATENT AND TRADEMARK OFFICE
CERTIFICATE OF CORRECTION

PATENT NO. : 4,203,950

DATED : May 20, 1980

INVENTOR(S) : Richard A. Sederquist

It is certified that error appears in the above—identified patent and that said Letters Patent is hereby corrected as shown below:

Column 3, line 40, "clindrical" should read -- cylindrical --.

Column 4, line 15, after "88" insert -- and --.

Column 5, line 44, "particles" should read -- particle --.

Column 7, line 41, "differenct" should read -- different --.

Column 7, line 45, "200°F" should read -- 2000°F --.

UNITED STATES PATENT AND TRADEMARK OFFICE
CERTIFICATE OF CORRECTION

PATENT NO. : 4,203,950
DATED : May 20, 1980
INVENTOR(S) : Richard A. Sederquist

It is certified that error appears in the above—identified patent and that said Letters Patent is hereby corrected as shown below:

Column 10, (Claim 1) lines 1-18, both equations should appear as shown below:

$$P_c = \frac{a\left[\dfrac{D_2{}^2 \Delta T_2 - D_1{}^2 \Delta T_1}{D_2{}^2 - D_1{}^2}\right] - a_c \Delta T_c}{\dfrac{1}{2E}\left[\dfrac{\dfrac{D_2{}^3}{r_2} + \dfrac{D_1{}^3}{r_1}}{D_2{}^2 - D_1{}^2}\right] + \dfrac{2}{3B}}$$

$$P_p = \frac{a\left[\dfrac{D_3{}^2 \Delta T_3 - D_2{}^2 \Delta T_2}{D_3{}^2 - D_2{}^2}\right] - a_p \Delta T_p}{\dfrac{1}{2E}\left[\dfrac{\dfrac{D_3{}^3}{r_3} + \dfrac{D_2{}^3}{r_2}}{D_3{}^2 - D_2{}^2}\right] + \dfrac{2}{3B}}$$

Signed and Sealed this

Fourteenth Day of October 1980

[SEAL]

Attest:

SIDNEY A. DIAMOND

Attesting Officer

Commissioner of Patents and Trademarks